United States Patent [19]

Rubens

[11] Patent Number: 5,149,799
[45] Date of Patent: Sep. 22, 1992

[54] METHOD AND APPARATUS FOR COOKING AND SPRAY-DRYING STARCH

[75] Inventor: Roger W. Rubens, East Brunswick, N.J.

[73] Assignee: National Starch and Chemical Investment Holding Corporation, Wilmington, Del.

[21] Appl. No.: 471,141

[22] Filed: Jan. 26, 1990

[51] Int. Cl.$^5$ .................. C08B 30/00; C08B 30/14
[52] U.S. Cl. .................. 536/102; 536/124; 536/127
[58] Field of Search .................. 536/102, 124, 127

[56] References Cited

U.S. PATENT DOCUMENTS

| | | | |
|---|---|---|---|
| 1,320,719 | 11/1919 | Stutzke | 127/33 |
| 1,901,109 | 3/1933 | Maier | 127/71 |
| 2,088,606 | 8/1937 | Peebles et al. | 426/471 |
| 2,314,459 | 3/1943 | Salzburg | 426/464 |
| 2,805,966 | 9/1957 | Etheridge | 127/32 |
| 3,332,785 | 7/1967 | Kuchinke et al. | 426/578 |
| 3,374,096 | 3/1968 | Knoch | 426/578 |
| 3,424,613 | 1/1969 | Huber et al. | 127/28 |
| 3,533,558 | 10/1970 | Masters | 239/404 |
| 3,583,874 | 6/1971 | Germino et al. | 426/578 |
| 3,628,734 | 12/1971 | Lindell et al. | 239/403 |
| 3,630,775 | 12/1971 | Winkler | 127/71 |
| 3,674,555 | 7/1972 | Meyer et al. | 127/29 |
| 3,693,886 | 9/1972 | Conrad | 239/432 |
| 3,730,729 | 5/1973 | Strommer | 426/50 |
| 3,747,851 | 7/1973 | Conrad | 239/8 |
| 4,280,851 | 7/1981 | Pitchon et al. | 127/33 |
| 4,600,472 | 7/1986 | Pitchon et al. | 159/4.4 |
| 4,610,760 | 9/1986 | Kirkpatrick et al. | 159/4.01 |
| 4,667,654 | 5/1987 | Thaler et al. | 127/65 |
| 4,847,371 | 7/1989 | Schara et al. | 536/111 |

FOREIGN PATENT DOCUMENTS

| | | |
|---|---|---|
| 0333674 | 9/1989 | European Pat. Off. . |
| 0366898 | 5/1990 | European Pat. Off. . |

OTHER PUBLICATIONS

K. Masters, *Spray Drying: Introduction to Principles, Operational Practice and Application*, 2d Ed., Halsted Press, New York, (1976) pp. 595-596.

Spray Nozzles and Accessories, Industrial Catalog 27, Spray Systems Co., Wheaton, Ill. (1976) pp. 1, 5, 45-62 and 67.

Delavan Industrial Nozzles and Accessories, Catalog No. 1266E-489-5m, Delavan Inc., West Des Moines, Iowa (1989).

*Primary Examiner*—Nathan M. Nutter
*Assistant Examiner*—Jeffrey C. Mullis
*Attorney, Agent, or Firm*—Mary E. Porter; Edwin M. Szala

[57] ABSTRACT

A method and an apparatus are provided for cooking and spray-drying a starch. In this method, the starch is uniformly and simultaneously atomized and cooked in the presence of an aqueous medium by means of a single atomization step carried out in an apparatus comprising a two-fluid, internal-mix spray-drying nozzle, coupled to a means for drying the cooked, atomized starch. Uniformly pregelatinized, cold-water-swelling starch with desirable textural, visual and organoleptic properties is advantageously provided by this method and apparatus.

8 Claims, 3 Drawing Sheets

METHOD AND APPARATUS FOR COOKING AND SPRAY-DRYING STARCH

BACKGROUND OF THE INVENTION

A method and an apparatus for cooking and spray-drying starch are provided herein. The starch is uniformly cooked to gelatinization in an atomized state by means of an apparatus comprising a two-fluid, internal-mix, spray-drying nozzle, coupled to a means for drying the cooked, atomized starch.

Problems associated with drying gelatinized starch are well-known in the art. Drum-drying processes expose casted sheets of gelatinized starch dispersions to open air for relatively long periods, permitting contamination; require scraping from a drum, flaking and milling, permitting metal particles to enter the starch; and generally place high demands upon manufacturing space, time and energy. Due to the high viscosity of fully gelatinized (cooked and hydrated) starch dispersions, spray-drying has been used only for very low concentration gelatinized starch dispersions, or for converted starches which have been severely degraded by conversion processes so that the viscosity of the gelatinized starch dispersion is greatly reduced, or for starch slurries in their granular, unhydrated or ungelatinized form.

In addition to the inefficiencies of conventional spray-drying and drum-drying processes, in many food applications the organoleptic quality of gelatinized starch dispersions prepared from granular starches is superior to that of pregelatinized starch dispersions prepared from reconstituted, conventionally-dried cold-water-swelling ("pregelatinized") starches. This quality difference is attributed to the tendency of the pregelatinized starch granules to swell to bursting, releasing their amylose and amylopectin contents, and irrevocably losing their granular structure, under the mechanical shear and thermal conditions of drum-drying and conventional spray-drying. Pregelatinized starches which are dried under these severe processing conditions have large amounts of granule destruction and may form undesirable pasty, grainy or mealy textures upon reconstitution in aqueous dispersions. Furthermore, absent chemical crosslinking and derivatization, conventionally dried starches, particularly drum-dried starches, typically do not sustain a desirable viscosity during prolonged heating and other processing conditions which are encountered in food applications.

Many conventional spray-drying processes have been disclosed. The particular textural and viscosity problems associated with spray-drying high viscosity hydrated or gelatinized starch are addressed in U.S. Pat. No. 4,280,851, issued Jul. 28, 1981 to Pitchon, et al., which provides a dual-atomization process for cooking or gelatinizing materials. In a first atomization step, this process employs a nozzle for high pressure spraying (atomizing) of the material to be cooked (e.g., granular starch slurry) through a small spinner/orifice into a precisely scaled, enclosed chamber. There the material is cooked by injection of a heating medium. In a second atomization step, the heating medium atomizes the cooked starch dispersion through a vent aperture at the bottom of the chamber and forces the cooked material into a dryer. An apparatus for carrying out this dual-atomization process is disclosed in U.S. Pat. No. 4,600,472, issued Jul. 15, 1986 to Pitchon, et al.

The Pitchon process and apparatus disadvantageously require a specially machined nozzle and chamber, which nozzle contains a starch slurry feed port with small orifices (0.016–0.042 in.) and spinners to achieve the first atomization step. The orifices plug easily and erode quickly under the high pressures (5000–7000 psig) needed to atomize the starch slurry through the feed port orifices and into the enclosed chamber. Additionally, the nozzle must be coupled to a high pressure pump to maintain the pressure needed for the first atomization step. These pumps, like the Pitchon nozzle, require frequent maintenance which limits the efficiency of the Pitchon spray-drying process.

Similar disadvantages are inherent in the starch spray-drying process disclosed in U.S. Pat. No. 4,847,371 to Schara, et al. A dual-atomization process and an apparatus similar to those of the Pitchon patents are employed by Schara, et al. to prepare certain pregelatinized dent cornstarch derivatives. Schara, et al. teach that the Pitchon process and apparatus are ill-suited for cooking and spray-drying corn starch, whereas the Schara, et al. process and apparatus are ill-suited for cooking and spray-drying tapioca starch.

It has now been discovered that a variety of high quality pregelatinized spray-dried starches may be efficiently produced without first atomizing the granular starch slurry. This is accomplished by employing modified, commercially-available standardized spray-drying nozzles and a relatively low pressure granular starch slurry feed in a single atomization step process.

SUMMARY OF THE INVENTION

A single atomization method and apparatus for cooking and spray-drying starch are provided. The method comprises:
a) slurrying the starch in an aqueous medium;
b) feeding a stream of the starch slurry at a pressure from about 50 to 200 psig into an atomizing chamber within a spray nozzle;
c) injecting a heating medium into the atomizing chamber at a pressure from about 50 to 250 psig;
d) simultaneously cooking and atomizing the starch slurry as the heating medium forces the starch through a vent at the bottom of the chamber; and
e) drying the atomized starch.

The apparatus comprises:
a) a two-fluid, internal mix, spray nozzle;
b) a means for feeding an aqueous slurry of the starch through one or more first aperture(s) located within the nozzle;
c) one or more second aperture(s) surrounding the first aperture within the nozzle;
d) an atomization chamber for receiving the slurry and mixing a heating medium with the slurry, which chamber contains a vent aperture;
e) a means for injecting the heating medium under pressure through the second aperture(s) and into the atomization chamber, thereby cooking the slurry to form a starch dispersion and atomizing the dispersion through the vent aperture; and
f) a means for drying the atomized dispersion as the dispersion exits the vent aperture.

This method and apparatus supply sufficient heat and moisture to the starch, as the starch is being atomized, to uniformly gelatinize the starch. The atomized, gelatinized starch may be dried with a minimum of heat or shear effects as it exits the atomization chamber. Thus, in comparsion to the commercially utilized pregelatinized starches known in the art, an aqueous dispersion of the spay-dried, pregelatinized cold-water-swelling starch produced by this method and apparatus exhibits significantly more of the desirable textural qualities and smooth appearance of a dispersion of a fully cooked starch which has not been pregelatinized.

BRIEF DESCRIPTION OF THE DRAWINGS

The features and advantages of the novel method and apparatus for cooking and spray-drying starch in accordance with the teachings of the present invention may be more readily understood by reference to the following detailed description of several preferred embodiments thereof, taken in conjunction with the accompanying drawings wherein identical reference numerals are used to refer to identical or similar elements throughout the several views, and in which.

DETAILED DESCRIPTION OF THE INVENTION

Figure 1:
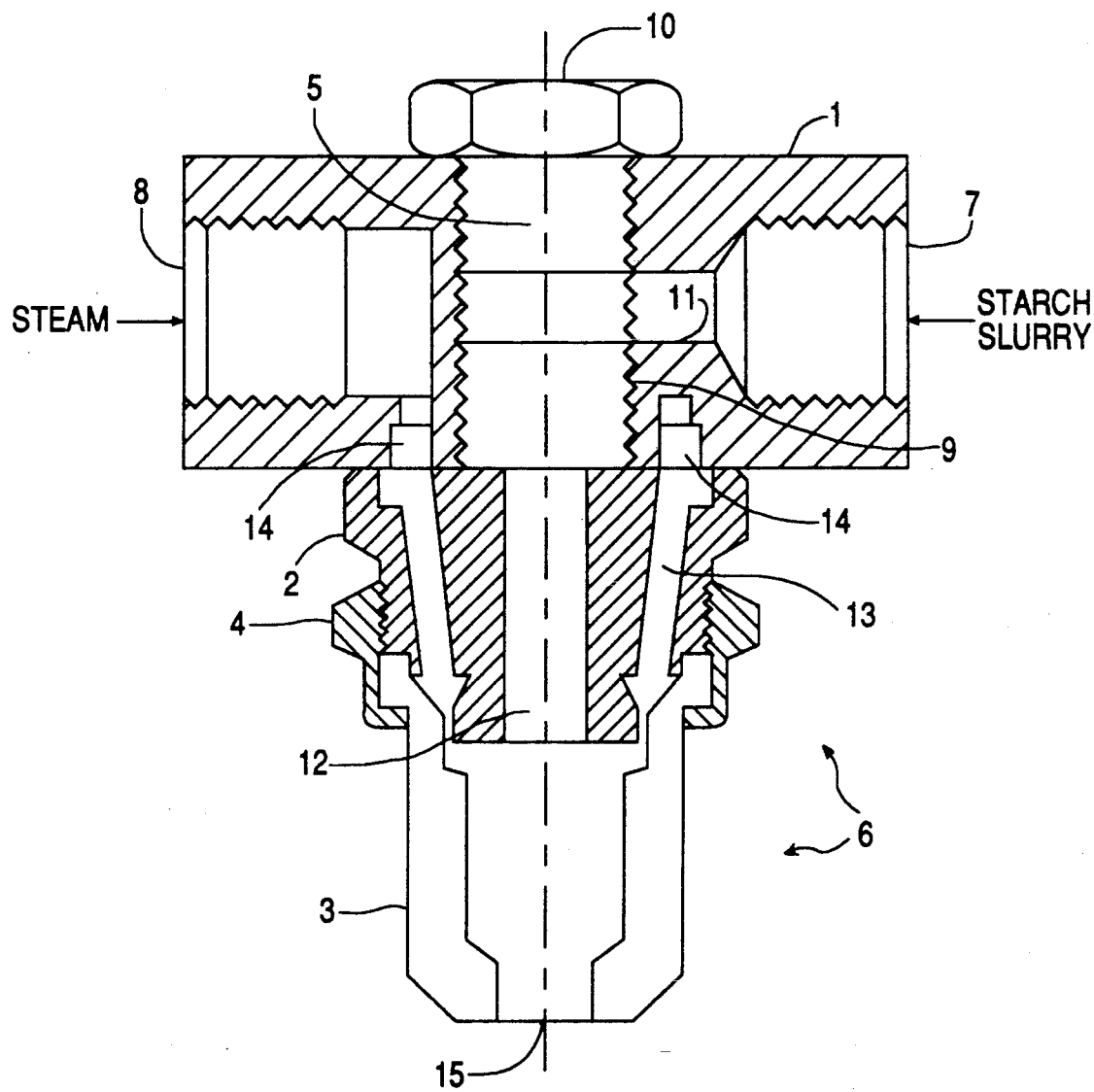
FIG. 1 is a vertical section illustrating a two-fluid, internal mix, spray nozzle.

Referring now in detail to the drawings, FIG. 1 illustrates an elevational sectional view of a two-fluid, internal-mix nozzle 6 having essentially 4 major components: a nozzle body 1, fluid cap 2, air cap 3, and retainer ring 4. Threaded openings (7 and 8) connect the nozzle to the fluid sources of, respectively, the slurried starch and the heating medium. The first threaded opening 7 normally connects the nozzle to a suitable supply of the slurried starch which, during operation, is fed to the nozzle by a positive action pump. The second opening 8 is connected to a supply of the heating medium, which is preferably steam, but alternatively can be a heating medium such as hot gases (air), super heated steam, heated fluids, etc.

The nozzle body 1 has a threaded, vertically-extending bore 5 which is centered with respect to a horizontal section through the body. Fluid cap 2 is secured to the lower part of body 1 with a protrusion 9 threaded to match those of threaded bore 5. The top section of 5 is closed with a hex-headed plug 10 threaded to match those of bore 5. Opening 7 communicates with bore 5 through a drilled hole 11 which extends from the end of the threads at 7 to the opening of bore 5. Thus, starch slurry entering through a threaded connection at 7 moves into the opening of 5 and down into the center of the fluid cap 2.

Fluid cap 2 has a drilled hole 12, centered within the cap and extending through it, which is aligned with threaded bore 5 and conveys starch slurry into air cap 3. Fluid cap 2 also has a plurality of heating medium interjection apertures 13 drilled concentrically around hole 12, angled off-vertical, and extending down through fluid cap 2. An annular groove 14 machined around bore 5 at the bottom of nozzle body 1 forms a manifold which communicates with threaded opening 8. Steam, or other heating medium, flows through opening 8 into manifold 14 which feeds the plurality (about 12) aperatures 13, introducing steam in a circular pattern into or air cap 3. Air cap 3 is secured to fluid cap 2 with retainer ring 4 which grasps a flange on the upper end of 3 and pulls it flush with 2 using matching threads of the ring 4 and corresponding part of fluid cap 2.

The interjected steam, or other heating medium, from apertures 13, acts to heat the starch slurry, entering air cap 3 from drilled hole 12, to the desired cooking or gelatinization temperature. The steam also provides the energy to simultaneously atomize the starch slurry/steam mixture as it exits vent aperture 15, so that it enters the dryer as a fine spray. The gelatinization and atomization of starch by the steam, or other heating medium, must occur practically, together so that continuous operation of the nozzle is not impeded by formation of high viscosity starch pastes within the nozzle.

The area enclosed between the inner surface of the air cap 3 and the lower surface of the fluid cap 2 forms the enclosed chamber wherein the heating medium is interjected into the starch slurry to heat the slurry to a tempertature effective to gelatinize the starch. The size and shape of the chamber and the size of the vent aperture 15 is effective to maintain a temperature and a moisture content within the chamber and a period of time for passage of the starch through the chamber sufficient to gelatinize the starch. The major portion of the gelatinization of the material occurs within the chamber, however, a minor amount of gelatinization may occur upon exit of the material from the chamber (from the vent aperture 15) which is due to the heat and moisture the material is subjected to within the chamber. Thus, the cooking or gelatinization step herein includes that which occurs within the chamber, as well as the gelatinization which occurs upon exit of the material from the chamber. Accordingly, the air cap 3 (therefore the chamber size and shape) and the size of the vent aperture 15 can be adjusted to control the temperature and moisture content in the chamber and the residence time of the material in the chamber and hence the cooking or gelatinization conditions and time to which the starch is subjected.

FIG. 2 is a side view illustrating an array of two-fluid nozzles 6 provided within a spray-drying tower. The manifold shown in FIG. 2 is drilled for four nozzles, but six or more could be accommodated within this tree-like structure. FIG. 2 illustrates one embodiment of low a plurality of nozzles may be combined in one spray-drying tower to provide the desired flow rate of cooked or gelatinized material. A spray-drying tower can be approximately twelve feet in diameter and thirty feet in height, and in another embodiment, six nozzles can be positioned at the top thereof.

FIG. 3 illustrates an elevational view of a second embodiment of a two-fluid internal-mix nozzle 24 constructed pursant to the teachings of the present invention. In this embodiment of the invention, the starch slurry to be processed enters the nozzle through an inlet port 25 and is injected from the port into a mixing chamber 26. The heating medium is tangetially injected into the mixing chamber 26 through opening 32, creating extreme turbulence, gelatinizing the starch and atomizing the starch dispersion. As the starch dispersion leaves chamber 26, it impinges against a deflector ring 34, moves through a high shear region 33, and impacts on an external pintle plate 29 which covers most of the vent aperature 30. In this process the sprayed dispersion is divided into finer particles and the angle of the spray is altered in a controllable way prior to exiting the nozzle.

A nozzle cap 31 encloses the inlet port 25 and heating medium interjection aperture 32, the nozzle cap 31 containing a vent aperture 30 positioned opposite the slurry inlet port. The enclosed area between the nozzle cap 31 and the inlet port 25 and heating medium aperture 32 forms the enclosed chamber 26 wherein the heating medium is injected into the starch slurry to cook or gelatinize the material. As with the previous nozzle 6 illustrated in FIG. 1, the size and shape of the chamber and vent aperture is effective to maintain the temperature and moisture content of the starch for a period of time sufficient to gelatinize the starch. The period of time for the passage of the atomized material through the chamber defines the gelatinization time of the material. The enclosed chamber maintains a desired temperature and moisture content enabling the material to be uniformly cooked or gelatinized therein.

Figure 3:
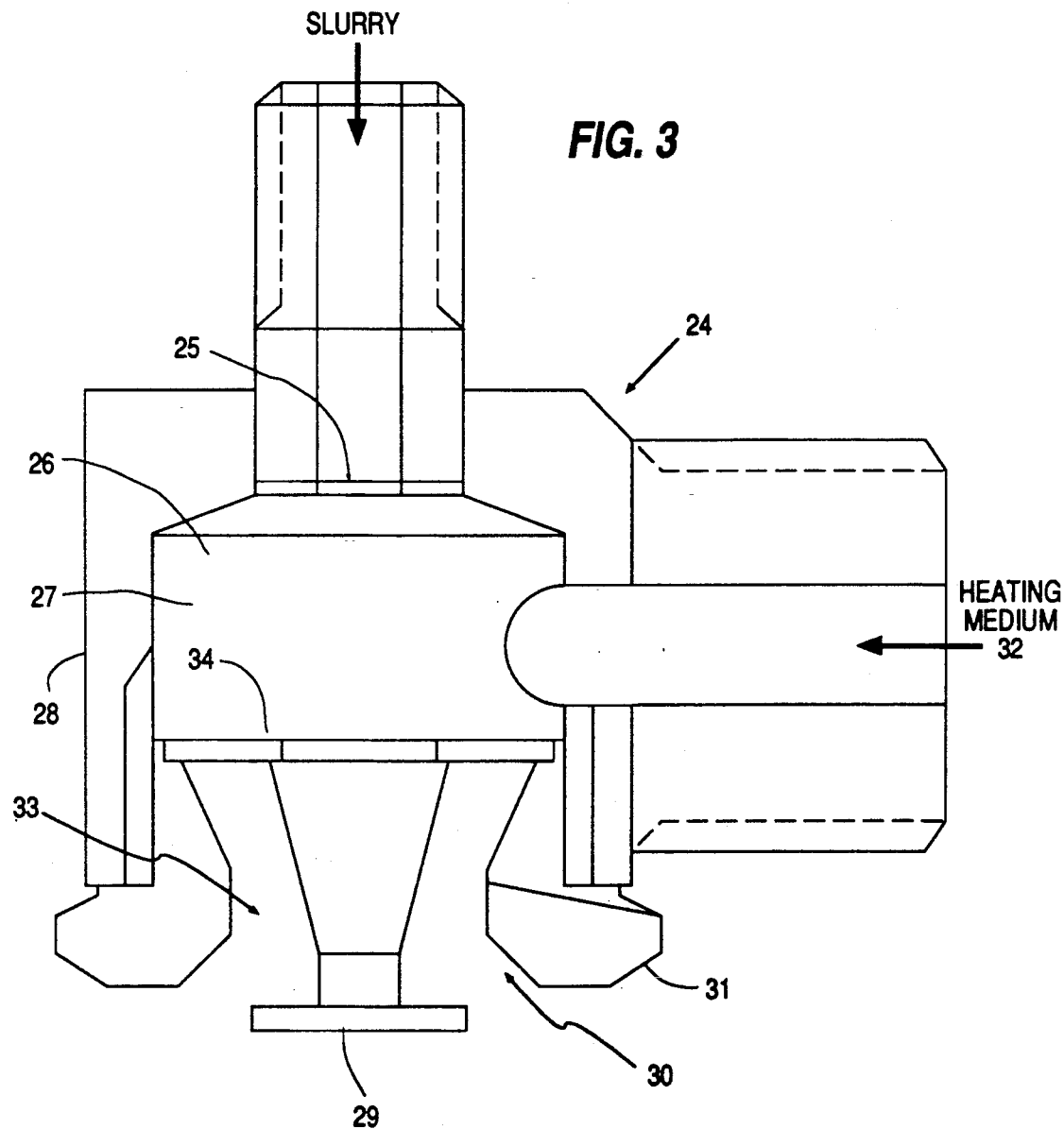
FIG. 3 is an elevational sectional view illustrating a second embodiment of a two-fluid, internal-mix nozzle constructed in accordance with the teaching of the present invention.

While FIGS. 1 and 3 illustrate preferred embodiments for the nozzle cap design and hence the preferred size and shape of the enclosed chamber, other designs are also comprehended by the instant invention. In light of the teachings herein, many of the two-fluid, or three-fluid, internal-mix nozzles used in industry may be adapted for use herein by one skilled in the art. The design of the nozzle cap and the positioning, size and number of vent apertures can be adjusted to obtain the desired cooking or gelantinization conditions (temperature, vapor pressure or moisture content) and time. Care must be taken in designing the nozzle cap and positioning the vent so that the starch slurry will be uniformly mixed with the heating medium and substantial clogging of the vent aperture is avoided. "Cooking" is subjecting the starch to the action of heat and moisture (or other vapor pressure) for a period of time, with "gelatinization" being a category of cooking in that subjecting the starch to the action of heat and moisture over time coverts it into a gelatinous form (e.g., by starch granules absorbing water and swelling).

The nozzle components may be constituted of metal, such as stainless steel, which is suitable for the processing of food products.

In various designs of a two-fluid, internal-mix nozzle, several parameters may be varied from embodiment to embodiment, such as the number of injection apertures. For instance, if the flow of liquified starch is constant or unchanged, the number and size of port(s) for the heating medium and the pressure under which the heating medium is injected establishes the ratio of heating medium to starch, which ratio affects the extent of gelatinization and the viscosity and texture of the starch product. Furthermore, enlarging the vent aperture 15 in FIG. 1 decreases the residence time for gelatinization which decreases the extent of gelatinization but provides finer particles.

The distance between the inlet port and the nozzle vent aperture also determines the time over which the material is cooked and the extent of gelatinization.

The size of the enclosed mixing chamber may be selected to suit the particular starch being spray-dried. The distance between the inlet port and vent aperture is preferably within the range of about 0.50 inches (13 mm) to 2.0 inches (51 mm), however, that distance may be varied from a smaller distance to a larger distance in other operational models. The larger distances result in a greater degree of cooling of the starch and may conceivably result in overcooking and fouling of the nozzle cap and nozzle vent aperture with starch, whereas the shorter distances may not provide for sufficient gelatinization. However, this is all dependent on the degrees of cooking or gelatinization desired for the particular starch with the size of the chamber and hence the time the starch spends in the chamber being adjusted accordingly.

Other apparent variables in the practice of the present invention are the temperature and vapor pressure (moisture content) within the chamber which is controlled by the size and shape of the chamber and vent aperture, as well as the temperature, pressure and flow rates of the heating medium (e.g., steam, super heated steam, heated gases, heated fluids, etc.) and concentration and flow rate of the starch slurry. In the present invention, steam supplied at a pressure above 90 psig (6.3 $Kg/cm^2$) would appear to be adequate to result in cooking or gelatinization of starch, although either higher or lower steam pressures could also be employed. The steam provides temperatures within the chamber in the range of from about 150° to 200° C., (300° to 390° F.), although either higher or lower temperatures may also be utilized depending upon other variables (pressure of steam, type of heating medium, size and shape of chamber and vent aperture, solids content, feed rate of starch slurry, proportion of heating medium to starch slurry, gelatinization or cooling temperature, type of material, additives or modifications of materials, etc.). Generally, a temperature of 149° C. to 205° C. (300° to 400° F.) within the chamber can be utilized to gelatinize starch, although preferably the chamber temperature is maintained within the range of 182° C. to 193° C. (360° to 380° F.).

Another variable which may be changed to control the temperature is the proportion of heating medium (e.g., steam) to the starch slurry (e.g., with the proportion being preferably controlled to within the range of 0.7 to 3 parts by weight steam/one part by weight starch slurry). Operation of the invention is affected by the size of the nozzle vent aperture, with it generally being desirable to maintain in a greater area for the heating medium interjection apertures than for the nozzle vent aperture, such that the chamber is maintained at a temperature and moisture content (vapor pressure) which enables the material to be cooked for gelatinized to the desired degree. Preferably the size of the nozzle vent aperture is within the range of about 0.25 inches (6.3 mm) to 0.5 inches (13 mm), however, this size may be varied from a smaller to a larger size in other operational models depending upon the temperature and moisture content desired as well as the flow rates of the heating medium and starch slurry.

Another variable which may be altered in different nozzle designs is the direction in which the heating medium is interjected, with it being possible to direct the interjected heating medium in the same general direction as the starch slurry (e.g., the nozzle in FIG. 1), or direct the interjected heating medium tangentially to the stream of slurry along the axis of the chamber. The enclosed chamber should be sufficiently large and the heating medium should be interjected so as to mix the heating medium with the starch slurry before the starch makes contact with the chamber wall, thus insuring a uniform and desired degree of atomization cooking or gelatinization of the starch.

The starch employed herein must be reduced to a liquid state (flows freely) by mixing the starch with an aqueous medium, which may be carried out by forming a dispersion or a slurry (includes suspensions, etc.). While water is preferred, alcohol, acetone, etc. or combinations thereof may also be employed. The starch is liquified or mixed with an aqueous medium by forming a slurry which may comprise at least 15% starch, preferably 35 to 45% starch by weight, as compared to prior art spray drying processes which generally have a maximum solids content to about 10% of gelatinized starch.

After the starch is cooked or gelatinized by the method of the present invention, the starch is then dried, preferably in a spray-drying tower although other types of drying apparatus may also be employed.

The starch may be agglomerated by any method known in the art. In a preferred embodiment, the starch is agglomerated in the spray drier by adjusting the position of the nozzles so that the sprays intersect, causing the atomized particles of starch to agglomerate. (See e.g., U.S. Pat. No. 4,871,398, issued Oct. 3, 1989 to Katcher, et al.)

The starch may be derived from any suitable source such as corn, sago, wheat, tapioca, rice, waxy rice, potato, sweet potato or waxy maize. Further, it may be in a raw unmodified state, or it may have been previously modified in any desired manner, as for example, by hydrolysis, oxidation, dextrinization, esterification, etherification, gelatinization, etc. or any combination of treatments. Flours, such as wheat or rice flour, may be employed herein and the term "starch" is meant to include such starch-containing materials. Starch may be combined or slurried with other ingredients, e.g., emulsifiers (mono and diglycerides, polysorbates, etc.), colors, flavors, carbohydrates (e.g. sugars), proteins, fats, processing aids, etc., followed by atomization and gelatinization or cooking by the process of this invention. In the treatment of starch from whatever source, the material feed temperature may range from above freezing, to ambient, to 140° F. (60° C.) and the feed pH may range from 2 to 12 (preferably 5 to 7). The starch may be uniformly gelatinized by the present invention to any desired degree, but preferably the starch is uniformly substantially completely gelatinized, as measured under a polarized light by the starch granule losing its birefringent patterns.

The present invention produces a high quality spray-dried, cold-water-swelling, pregelatinized starch. The gelatinized starch granules obtained are uniformly swelled to the maximum extent, with a minimum of granule breakage, or heat damage. The amount of granule breakage depends on the type of starch and the amount of modification, if any, of the starch. For example, an unmodified waxy maize starch has a majority of broken granules after processing, whereas a crosslinked cornstarch has a majority of unbroken granules after processing.

The starch of the present invention contains a greater degree of whole, unbroken granules than a starch prepared by conventional spray-drying or drum-drying processes with similar degrees of modification (chemical or physical) of the starch. Upon dispersion in cold water, these starches have a smooth, uniform, homogeneous, continuous and non-grainy texture which, in comparison with pregelatinized starches known in the art, more closely resembles that of a cooked dispersion of a starch which has not been pregelatinized.

The dried starch prepared by the present invention requires a lower level of chemical modification (or no chemical modification) to obtain a pregelatinized, dried starch which upon hydration exhibits desirable appearance (high sheen) and stable textural characteristics (smooth, continuous, homogeneous and non-grainy, thickened dispersion), which conventionally were obtainable only with higher levels of chemical modification. The differences between conventionally drum-dried or spray-dried pregelatinized starch and the dried starch prepared by the present invention become even more pronounced as the level of chemical modification of the starch is lowered.

EXAMPLE 1

Figure 2:
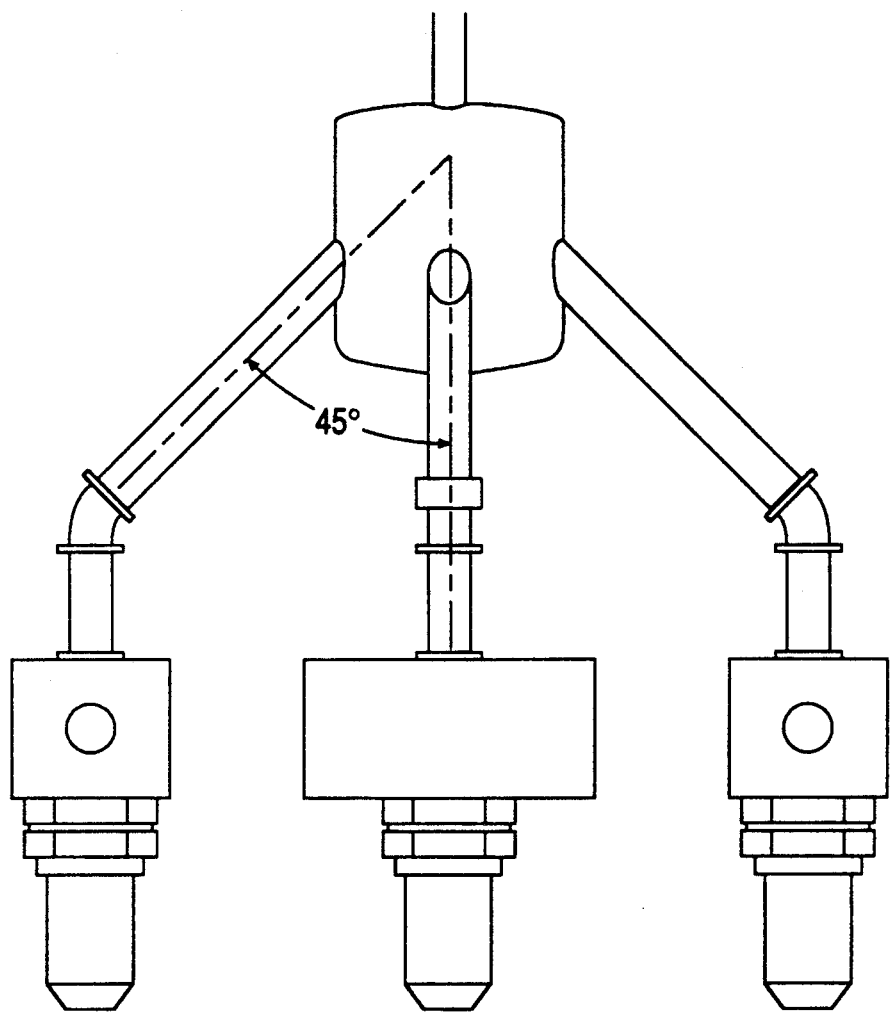
FIG. 2 is a side view illustrating an array of two-fluid nozzles in a spray-drying tower.

Three nozzles obtained from Spraying Systems Company, Wheaton, Ill. (Model IJ Nozzles, Set-up 152), as illustrated in FIG. 1, ("SS1J") were arranged in a spray dryer as illustrated in FIG. 2. Ungelatinized, unmodified corn starch was slurried in water at room temperature at 33% solids, by weight. The slurry was pumped at about 220 psig into each nozzle at a rate of 1.3 gal/min with a centrifugal pump.

Saturated steam at 155 psig, as the heating and atomizing medium, was injected into each nozzle at a rate of 17 lbs/min providing a ratio of steam:slurry of 1.4:1.0. The spray from each nozzle appeared uniform, narrow, long, and it billowed as it traveled down the dryer. Although the vent apertures on each nozzle were on centers separated by less than 8 inches, the spray patterns did not intersect.

The temperature of the inlet air to the dryer was 163° C. (325° F.) and the exhaust air was 91° C. (195° F.). The finely atomized gelatinized starch dried easily as shown by clean chamber walls without any significant build-up of hard or gelatinous material. The dried starch product had a moisture content of 5.8% and pH of 7.5. Alpine particle size analysis showed only a trace retained on 100 mesh screen (USSS), about 20% on 200 mesh, 20% on 400 mesh and 60% passing thru 400 mesh.

Water dispersions of the starch product at 10% solids were relatively stable and had a smoother, shorter texture than a drum-dried control sample. Pregelatinized unmodified corn starch prepared with the SS1J showed some of the properties heretofore achieved only by derivatization, or by using waxy maize starch in place of corn starch. When the powder was agglomerated for use as a thickener in instant soups, the product showed good dispersibility, a stable, "heavy" body, and finely textured surface. It had significantly better properties than a drum-dried sample which set quickly to a grainy, chunky consistency.

Thus, this spray-drying process produced pregelatinized corn starch of a quality far superior to that of a drum-dried pregelatinized corn starch.

The spray-dried product was also examined after re-wetting on a microscope slide (about 2 mg of starch was sprinkled on a microscope slide and 2 drops of 0.01N Iodine/KI solution were stirred into the starch and observations were timed). About 1.5 minutes after wetting, more than 80% of the granules had the shape and size of whole, unbroken granules. Although the granules started swelling and breaking after 10 minutes, more than 50% still showed whole, unbroken outlines 30 minutes after re-wetting. In contrast, a drum-dried corn starch showed extensive destruction after 1.5 minutes and only a small number of whole granules. Thus, much of the original integrity was retained upon reconstitution of starch prepared by the process of this invention.

The Brabender viscosity patterns of ths spray-dried, pregelatinized corn starch were compared with those of a drum dried corn starch dispersion. The results are shown in Table I, below.

TABLE I

| Gelatinized Starch Sample | Brabender Viscosity (B.U.) | | |
|---|---|---|---|
| | 10 mins at 25° C. | Viscosity at Peak | 15 mins. at 95° C. |
| Example 1 | | | |
| Spray-Dried[a] Corn Starch (SS1J) | 380 | 1340 | 300 |
| Drum-Dried Corn Starch[a,b] | 500 | 580 | 440 |

| Gelatinized Starch Sample | Brabender Viscosity (B.U.) | | |
|---|---|---|---|
| | 10 mins at 30° C. | Viscosity at Peak | 10 mins at 95° C. |
| Example 2 | | | |
| Spray-Dried[c] Tapioca Starch (SS1J) | 1080 | 1130 | 560 |
| Drum-Dried Tapioca Starch[c,d] | 2040 | 3900 | 250 |
| Example 3 | | | |
| Spray-Dried[c] Tapioca Starch (Delavan) | 830 | 980 | 530 |

[a] A total of 35 g starch, dry weight basis, 90 g sucrose and 435 g water were blended together to form the sample. The sample was held at 25° C. for 10 minutes, heated to 95° C., and held at 95° C. for 15 minutes.
[b] A commercially available pregelatinized drum-dried corn starch.
[c] No sucrose was used. A total of 36.8 g of starch, dry weight basis, was blended with 423.2 g water. The sample was held at 30° C. for 10 minutes, heated to 95° C. at a rate of 1.5° C./minute, and held at 95° C. for 10 minutes.
[d] A commercially available pregelatinized drum-dried tapioca starch.

EXAMPLE 2

This example illustrates that the spray-drying process and apparatus herein may be employed to pregelatinize a variety of native starches.

The SS1J nozzle illustrated in FIG. 1 was installed at the top of a co-current spray-dryer. Ungelatinized, unmodified tapioca starch was slurried in water at room temperature at 36% solids, by weight, and pumped into the nozzle with a centrifugal pump at 16 lbs/min and a pressure of 175 psig.

Steam at 180 psig was injected into the nozzle at 20 lbs/min for a steam: slurry ratio of 1.3:1.0. The temperature of the inlet air to the dryer was 152° C. (305° F.) and the exhaust air was 118° C. (245° F.). The spray pattern of gelatinized starch was uniform, narrow and long. The fine spray of gelatinized starch dried easily with a smooth flow of powder to the collection system and with no significant build-up of moist, gummy starch on the walls of the drying chamber. The starch was completely gelatinized as evidenced by the absence of crosses (birefringence) when examined with a microscope under polarized light. Particle size analysis showed about 70% passing a 200 mesh screen (USSS).

Microscopic examination of unmodified tapioca starch, pregelatinized with the SS1J nozzle, revealed a much different dynamic morphology than the SS1J nozzle treated corn starch described in Example 1. The tapioca starch granular outlines started swelling immediately and were large, distorted and diffuse as early as 1.5 minutes after re-wetting. After 10 minutes, very few granular outlines were visible.

The results of Brabender viscosity pattern analysis are shown in Table I, above.

A drum-dried, unmodified tapioca starch had a substantially different Brabender pattern than that of the spray-dried tapioca, rising quickly within the first 30 seconds to 3900 B.U., then falling continuously throughout the remainder of the test (Table I, above).

The high, early viscosity of drum-dried tapioca resulting from severe granular destruction would not be suitable for most applications requiring agitation, heating or low pH during processing. In contrast, the SS1J nozzle product provided a more stable viscosity, smoother, shorter texture and, after processing, more thickening power. Similar beneficial qualities were exhibited by modified and unmodified waxy maize starches which had been processed through the SS1J nozzle.

EXAMPLE 3

This example illustrates that different configurations of the two-fluid internal-mix nozzle may be employed in the process of this invention.

A Delavan Swirl-Air, Model 31618, two-fluid, internal mix spray nozzle (obtained from Delavan Manufacutring Co., Des Moines, Iowa), as illustrated in FIG. 3., ("Delavan nozzle") was installed in a co-current spray dryer. Ungelatinized, unmodified tapioca starch was slurried in water at room temperature at 37% solids, by weight, and pumped into the Delavan Nozzle with a centrifugal pump at 15 lbs/min and a pressure of 75 psig.

Saturated steam at 148 psig was injected into the nozzle at 22 lbs/min providing a steam: slurry ratio of 1.5:1.0. The temperature of the inlet air to the dryer was 152° C. (305° F.) and the exhaust air was 132° C. (270° F.). The spray pattern of finely atomized, gelatinized starch was uniform with a wider spray angle then observed with the SS1J nozzle. The particles of cooked starch dried easily as shown by substantially clean walls of the drying chamber. Gelatinization was complete as there were no crosses observed when the starch was examined with the microscope under polarized light.

A Brabender viscosity profile for the Delavan nozzle pregelatinized tapioca starch is shown in Table I, above. These viscosities are lower than those of the same tapioca starch dried with the SS1J nozzle in Example 2. The size and configuration of the nozzle chamber in which steam and starch were mixed did not provide as much retention time as the SS1J. Although lower in viscosity, starch prepared with the Delavan nozzle had properties in instant food applications which were more like the SS1J nozzle starches than a drum-dried starch. Starch pastes made from Delavan products for use in fruit fillings, sauces, gravies and soups showed viscosity stability, were smoother, had shorter textures, and, after processing, were heavier-bodied than a drum-dried control. Similar results were achieved by processing corn starch, potato starch, wheat starch and modified waxy maize starch with the Delavan nozzle.

Microscopic examination of re-wetted particles showed that the granules started swelling immediately and at the end of 1.5 minutes more than 90% were formless, broken, and diffuse. After 10 minutes, most of the particles were dispersed but the number of well defined granular outlines was greater than those prepared with the SS1J in Example 2.

EXAMPLE 4

This example illustrates the use of another apparatus in the process of this invention and illustrates the use of the process herein to prepare dried, pregelatinized, modified starch derivatives.

A small scale model of the SS1J nozzle, the SS ¼J nozzle, ("SS ¼J") also obtained from Spraying Systems Company, Wheaton, Ill., in which the air cap was extended by 2 mm with a spacer, was installed at the top of a co-current pilot plant spray dryer. An ungelatinized waxy maize starch (corn hydrid containing 97%-100% amylopectin), which had been modified by esterification and crosslinking for improved textural properties, was slurried in water at room temperature at 25% solids by weight. The slurry was pumped to the nozzle with a laboratory scale centrifugal pump at 15 lbs/hr which developed 128 psig pressure at the nozzle.

Saturated steam at 155 psig was injected into the nozzle to form a very fine, uniform, billowing spray into the drying chamber. The inlet air temperature 210° C. (410° F.) and the exhaust air was 135° C. (257° F.). The starch dried easily as evidenced by a smooth flow of powder to the collection system and the appearance of only a light dusting of powder on the chamber walls. Microscopic examination under polarized light showed no birefringent crosses indicating all granules were completely gelatinized.

Brabender viscosity profiles of the spray-dried starch and a drum-dried control are shown in Table II, below. The higher breakdown and loss of useable viscosity was typical of that observed for drum-dried products and was caused by severe granular disruption during processing.

The higher breakdown was also characteristic of samples with relatively longer, gummier, grainier texture. The SS ¼J nozzle processed starches had markedly improved sheen, clarity and smoothness compared to drum-dried controls.

Microscopic examination showed that the rate of swelling was intermediate with respect to a corn starch, which sustained most granular outlines, and a tapioca starch, which swelled to formless, diffuse outlines within 1.5-10 minutes. After 1.5 minutes the modified waxy maize starch (cross-linked) has swelled substantially but most of the granular outlines were clearly defined. After 10 minutes, there was more extensive swelling and more fragments, but more than 50% of clear, granular outlines remained. After 30 minutes, there were few granular outlines and most granules had swollen to formless, diffuse debris.

In a similar manner, improved viscosity control and stability, sheen, clarity and smoothness (in comparison with drum-dried controls) was achieved by employing the SS ¼J nozzle and the process herein to spray-dry and pregelatinize unmodified wheat starch and flour, potato starch, rice starch and flour, and waxy rice, waxy maize, dent corn, tapioca, and high amylose corn starches and modified (by hydroxypropylation, acetylation, esterification with octenyl succinic anhydride, phosphorylation crosslinking and/or conversion and combinations thereof) waxy maize, tapioca and corn starches.

Improved dispersibility in hot and cold water was observed after the SS¼J processed corn and high amylose starches had been agglomerated. These starches were agglomerated with a Model MP-1 laboratory scale agglomerator obtained from the Aeromatic Company, Towaco, N.J.

TABLE II

| Gelatinized Starch Sample | Brabender Viscosity (B.U.) | | |
|---|---|---|---|
| | 10 mins at 30° C. | Viscosity at Peak | 10 mins. at 95° C. |
| Example 4 | | | |
| Spray-Dried[a] Waxy Maize Starch Derivative (SS 1/4J) | 600 | 1490 | 1350 |
| Drum-Dried[a,b] | 720 | 1540 | 640 |

TABLE II-continued

| Gelatinized Starch Sample | Brabender Viscosity (B.U.) | | |
|---|---|---|---|
| | 10 mins at 30° C. | Viscosity at Peak | 10 mins. at 95° C. |
| Waxy Maize Starch Derivative | | | |

[a]A total of 26.55 g starch, dry weight basis, 132.75 g sucrose, 10.8 g glacial acetic acid and 405.9 g water were blended to prepare the sample. The sample was held at 30° C. for 10 minutes, heated to 95° C. at a rate of 1.5° C./minute, and held at 95° C. for 10 minutes.
[b]A commercially available crosslinked, esterified, pregelatinized drum-dried starch.

EXAMPLE 5

This example compares the product and process of U.S. Pat. No. 4,280,851 (the "Pitchon" patent) to the product and process herein and to the product obtained by preparing a starch dispersion from a starch which had not been pregelatinized.

Several nozzles were assembled according to the teaching of FIG. 1 of the Pitchon patent (U.S. Pat. No. 4,280,851). The four atomization apertures in each nozzle (No. 26 in FIG. 1) were machined to accommodate spinners (cores) and orifices purchased from the Spraying Systems Company of Wheaton, Ill. The nozzles were arranged within the dryer on a "tree" type manifold with each nozzle inclined from vertical to provide a uniform spray distribution.

A modified waxy maize starch was slurried in water at 34.1% solids by weight and pumped into the nozzles at 5000 psig with a Manton Gaulin triplex, reciprocating, positive displacement, high pressure pump. Saturated steam at 155-160 psig was injected into each nozzle at a ratio of steam to slurry of about 0.9 in weight units of flow. A somewhat elongated, hollow, conical, and uniform spray pattern was observed from each nozzle.

The temperature of the inlet air to the dryer was 179°-182° C. (355°-360° F.) and the exhaust air was 81°-83° C. (178°-182° F.). The cooked and finely atomized starch particles dried easily, with a smooth flow of powder to the collection system, and only a light dusting of starch on the chamber walls.

A Brabender viscosity profile of the product is shown in Table III. Also shown in Table III are viscosity profiles of: waxy maize starch which was pregelatinized and dried according to Example 4; drum-dried waxy maize starch; and granular waxy maize starch which was cooked to 76° C. to form a fully gelatinized dispersion.

TABLE III

| Gelatinized Starch Sample[a] | Brabender Viscosity (B.U.) | | |
|---|---|---|---|
| | 10 mins at 30° C. | Viscosity at Peak | 10 mins at 95° C. |
| Example 5 | | | |
| Spray-Dried Waxy Maize Starch (Pitchon) | 810 | 1380 | 110 |
| Example 4 | | | |
| Spray Dried Waxy Maize Starch (SS 1/4J) | 600 | 1490 | 1380 |
| Drum-Dried Waxy Maize Starch[b] | 1200 | 1690 | 770 |
| Granular[c] Cooked | — | 1350 | 1100 |

TABLE III-continued

| Gelatinized Starch Sample[a] | Brabender Viscosity (B.U.) | | |
|---|---|---|---|
| | 10 mins at 30° C. | Viscosity at Peak | 10 mins at 95° C. |
| Waxy Maize Starch | | | |

[a] A total of 26.55 g starch, dry weight basis, 132.75 g sucrose, 10.8 g glacial acetic acid and 405.9 g water were blended to prepare the sample. The sample was held at 30° C. for 10 minutes, heated to 95° C. at a rate of 1.5° C./minute, and held at 95° C. for 10 minutes.
[b] A commercially available crosslinked, esterfied, pregelatized drum-dried starch.
[c] The granular starch was a crosslinked, esterified granular waxy maize starch. A slurry of this granular starch was heated to 76° C. to initiate gelatinization prior to taking the Brabender profile.

Microscopic examination of the Pitchon starch showed that most of the granular shaped particles retained well defined outlines for about 10 minutes after rewetting, then swelled to large, formless, diffuse outlines in the period from 10 to 30 minutes after rewetting. The same starch made with a drum-dryer showed immediate granular disruption and no defined outlines, even at the onset of rewetting.

The paste or dispersion properties of these starches were compared by preparing a dispersion of 25.8 g starch, 91.2 g sugar and 285 g of a 50/50 mixture of cranberry juice and distilled water. For the granular starch a slurry of 9.1 g starch, 50 g water and 50 g cranberry juice was cooked with stirring in a boiling water bath for 5 minutes, 32 g of sugar were added and the sample was allowed to cool to room temperature before visual evaluation.

The granular starch cooked on a boiling water bath showed superior viscosity, clarity and sheen, but had a somewhat long and gummy texture when compared to the pregelatinized starches which were re-dispersed cold in the solution. The Pitchon and SS1J spray-dried products were superior to the drum-dried product with respect to viscosity, texture (absence of grain), sheen and length (or absence of stringiness or gumminess). The Pitchon spray-dried product had the least clarity and was cloudier than the drum-dried product. Thus, the SS1J spray-dried product represents a significant improvement with regard to drum-drying, now the most prevalent method for making pregelatinized starches. In many applications, the redispersed pregelatinized spray-dried starches are also heated, as in the baking of fruit filled pies, and this may enhance their organoleptic quality relative to cooked granular starch.

Experimental work also showed some problems with the orifice insert used to develop the high pressure spray over extended use of the nozzle according to the Pitchon process. When the orifice inserts were made from hardened stainless steel or silicon carbide, they had to be replaced after about 70 hours because of excessive wear (orifice enlarged). With tungsten carbide orifices, the operating life was extended to 150-200 hours. However, these orifices were brittle and difficult to use because the metal was so hard. Further, if the orifices were used intermittently, some of the tungsten carbide orifices invariably shattered when they were placed back in operation. Repetitive heating and cooling stressed a certain percentage of the devices. This breakage caused serious downtime and cleanup problems. None of these problems were observed with extended use of the process and apparatus of this invention.

Now that the preferred embodiments of the present invention are described in detail, various modifications and improvements thereon, will become readily apparent to those skilled in the art. Accordingly, the spirit and scope of the invention are to be limited by the appended claims, and not by the foregoing specification.

I claim:

1. A method for cooking and spray-drying a starch, comprising:
   a) slurrying the starch in an aqueous medium;
   b) feeding a stream of the starch slurry at a pressure from about 50 to 250 psig without atomizing the starch slurry as it enters into an atomizing chamber within a spray-drying nozzle;
   c) injecting a heating medium into the atomizing chamber at a pressure from about 50 to 250 psig;
   d) simultaneously cooking and atomizing the starch slurry as the heating medium forces the starch through a vent in the chamber; and
   e) drying the atomized starch.

2. The method of claim 1, wherein the heating medium is steam.

3. The method of claim 1, wherein the starch is ungelatinized.

4. The method of claim 3, wherein the starch slurry is cooked to a degree sufficient to uniformly gelatinize the starch without substantial degradation of the starch.

5. An improved method for uniformly cooking and spray-drying a starch comprising:
   a) slurrying the starch in an aqueous medium;
   b) feeding a stream of the starch slurry at a pressure from about 50 to 250 psig without atomizing the starch slum, as it enters into an atomizing chamber within a spray drying nozzle;
   c) injecting a heating medium into the atomizing chamber at a pressure from about 50 to 250 psig;
   d) simultaneously cooking and atomizing the starch slurry as the heating medium forces the starch through a vent in the chamber; and
   e) drying the atomized starch, wherein the improvement comprises substituting a single atomization step in place of a dual atomization step, thereby permitting the starch slurry to be fed into the nozzle under pressures not exceeding 250 psig, without the use of starch slurry atomization orifices.

6. A starch prepared by the method of claim 1.

7. The method of claim 1, further comprising the step of agglomerating the dried starch.

8. A starch prepared by the method of claim 6.

* * * * *